(12) United States Patent
Wu

(10) Patent No.: US 11,178,690 B2
(45) Date of Patent: Nov. 16, 2021

(54) DEVICE AND METHOD OF HANDLING A CHANNEL ACCESS PROCEDURE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 187 days.

(21) Appl. No.: 15/965,998

(22) Filed: Apr. 30, 2018

(65) Prior Publication Data

US 2018/0317258 A1 Nov. 1, 2018

Related U.S. Application Data

(60) Provisional application No. 62/492,928, filed on May 1, 2017.

(51) Int. Cl.
| | |
|---|---|
| *H04W 74/08* | (2009.01) |
| *H04W 36/00* | (2009.01) |
| *H04W 16/14* | (2009.01) |
| *H04L 12/801* | (2013.01) |
| *H04W 72/14* | (2009.01) |

(52) U.S. Cl.
CPC ......... *H04W 74/0808* (2013.01); *H04L 47/11* (2013.01); *H04W 16/14* (2013.01); *H04W 36/00* (2013.01); *H04W 72/14* (2013.01)

(58) Field of Classification Search
CPC .............................. H04W 36/14; H04W 36/30
See application file for complete search history.

(56) References Cited

U.S. PATENT DOCUMENTS

| | | | | |
|---|---|---|---|---|
| 10,142,963 | B2* | 11/2018 | Park | H04W 4/06 |
| 10,568,007 | B2* | 2/2020 | Park | H04W 36/30 |
| 10,716,039 | B2* | 7/2020 | Park | H04W 36/0072 |
| 2007/0048047 | A1* | 3/2007 | Matsuno | G03G 15/2053 |
| | | | | 399/333 |
| 2009/0017824 | A1* | 1/2009 | Lee | H04W 36/14 |
| | | | | 455/437 |
| 2012/0164979 | A1* | 6/2012 | Bachmann | H04W 12/062 |
| | | | | 455/411 |

(Continued)

FOREIGN PATENT DOCUMENTS

| | | |
|---|---|---|
| CN | 106452705 A | 2/2017 |
| CN | 106471849 A | 3/2017 |

(Continued)

OTHER PUBLICATIONS

Search Report dated Sep. 3, 2018 for EP application No. 18170110.3, pp. 1-5.

(Continued)

*Primary Examiner* — Parth Patel
*Assistant Examiner* — Berhanu D Belete
(74) *Attorney, Agent, or Firm* — Winston Hsu

(57) ABSTRACT

A communication device for handling a channel access procedure, comprises a storage device and a processing circuit coupled to the storage device. The storage device stores, and the processing circuit is configured to execute instructions of: receiving a system information (SI) broadcasted by a first cell of a first BS, wherein the SI configures a first energy detection threshold; and performing a first channel access procedure on a first unlicensed carrier according to the first energy detection threshold.

8 Claims, 5 Drawing Sheets

(56) References Cited

U.S. PATENT DOCUMENTS

| | | | |
|---|---|---|---|
| 2012/0230244 A1* | 9/2012 | Bienas | H04W 40/22 370/315 |
| 2013/0017794 A1* | 1/2013 | Kloper | H04W 74/0808 455/63.1 |
| 2014/0282784 A1* | 9/2014 | Pfeffer | H04N 21/8586 725/112 |
| 2015/0245327 A1* | 8/2015 | Damnjanovic | H04W 16/14 370/336 |
| 2015/0365880 A1* | 12/2015 | Malladi | H04W 16/14 370/312 |
| 2016/0050667 A1* | 2/2016 | Papasakellariou | H04L 1/1822 370/329 |
| 2016/0234861 A1* | 8/2016 | Ye | H04W 74/0808 |
| 2016/0277945 A1* | 9/2016 | Bienas | H04W 24/02 |
| 2017/0048047 A1* | 2/2017 | Kadous | H04L 1/1887 |
| 2017/0048738 A1* | 2/2017 | Wang | H04W 24/10 |
| 2017/0048889 A1* | 2/2017 | Kadous | H04W 74/0816 |
| 2017/0142751 A1* | 5/2017 | Liu | H04L 5/0053 |
| 2017/0180974 A1* | 6/2017 | Bienas | H04W 48/08 |
| 2017/0230944 A1* | 8/2017 | Babaei | H04W 74/006 |
| 2017/0230945 A1* | 8/2017 | Babaei | H04W 72/14 |
| 2017/0325174 A1* | 11/2017 | Dinan | H04W 52/34 |
| 2018/0020483 A1* | 1/2018 | Lee | H04W 48/16 |
| 2018/0049243 A1* | 2/2018 | Lee | H04W 72/042 |
| 2018/0098353 A1* | 4/2018 | Lee | H04W 56/00 |
| 2018/0124656 A1* | 5/2018 | Park | H04W 36/0072 |
| 2018/0124825 A1* | 5/2018 | Lee | H04W 74/006 |
| 2018/0176961 A1* | 6/2018 | Babaei | H04W 74/0833 |
| 2018/0184475 A1* | 6/2018 | Babaei | H04W 72/082 |
| 2018/0220458 A1* | 8/2018 | Ouchi | H04W 74/0808 |
| 2019/0174546 A1* | 6/2019 | Jeon | H04W 74/0816 |
| 2019/0289657 A1* | 9/2019 | Babaei | H04W 72/1215 |
| 2019/0373301 A1* | 12/2019 | Gunasekara | H04N 21/2393 |
| 2019/0380069 A1* | 12/2019 | Park | H04W 36/0044 |
| 2020/0008154 A1* | 1/2020 | Dinan | H04W 52/346 |
| 2020/0245205 A1* | 7/2020 | Park | H04W 36/0077 |
| 2020/0344652 A1* | 10/2020 | Park | H04W 36/0072 |
| 2021/0168760 A1* | 6/2021 | Park | H04W 4/40 |

FOREIGN PATENT DOCUMENTS

| | | |
|---|---|---|
| WO | 2015/191963 A1 | 12/2015 |
| WO | 2016/060805 A1 | 4/2016 |

OTHER PUBLICATIONS

"14 UE procedures related to Sidelink", 3GPP TS 36.213 V14.1.0 (Dec. 2016), Release 14, France, Dec. 2016, XP051250481, pp. 352-408.

3GPP TS 36.331 V14.2.0, Mar. 2017.

3GPP TS 36.213 V14.2.0 (Mar. 2017).

3GPP TR 36.889 V13.0.0, Jun. 2015.

HTC, Discussion on Adaptation Rules of the Maximum Energy Detection Threshold in LAA Coexistence, 3GPP TSG RAN WG1 Meeting #83, R1-157281, Anaheim, USA, Nov. 15, 2015.

Huawei et al., Introduction of enhanced LAA for LTE, 3GPP TSG-RAN WG2 Meeting #95, R2-165964, Gothenburg, Sweden, Aug. 22, 2016.

Office action dated Jun. 17, 2020 for the China application No. 201810411443.8, filing date May 2, 2018, p. 1-12.

* cited by examiner

DEVICE AND METHOD OF HANDLING A CHANNEL ACCESS PROCEDURE

CROSS REFERENCE TO RELATED APPLICATIONS

This application claims the benefits of U.S. Provisional Applications No. 62/492,928 filed on May 1, 2017, which is incorporated herein by reference.

BACKGROUND OF THE INVENTION

1. Field of the Invention

The present invention relates to a device and a method used in a wireless communication system, and more particularly, to a device and a method of a channel access procedure.

2. Description of the Prior Art

A user equipment (UE) may perform a channel access procedure on an unlicensed carrier, before the UE performs a transmission on the unlicensed carrier. However, it is unknown how to perform the channel access procedure on the unlicensed carrier. Thus, performing the channel access procedure on the unlicensed carrier is an important problem to be solved.

SUMMARY OF THE INVENTION

The present invention therefore provides a method and related communication device for handling a pre-allocated uplink grant to solve the abovementioned problem.

A communication device for handling a channel access procedure, comprises a storage device and a processing circuit coupled to the storage device. The storage device stores, and the processing circuit is configured to execute instructions of: receiving a system information (SI) broadcasted by a first cell of a first BS, wherein the SI configures a first energy detection threshold; and performing a first channel access procedure on a first unlicensed carrier according to the first energy detection threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
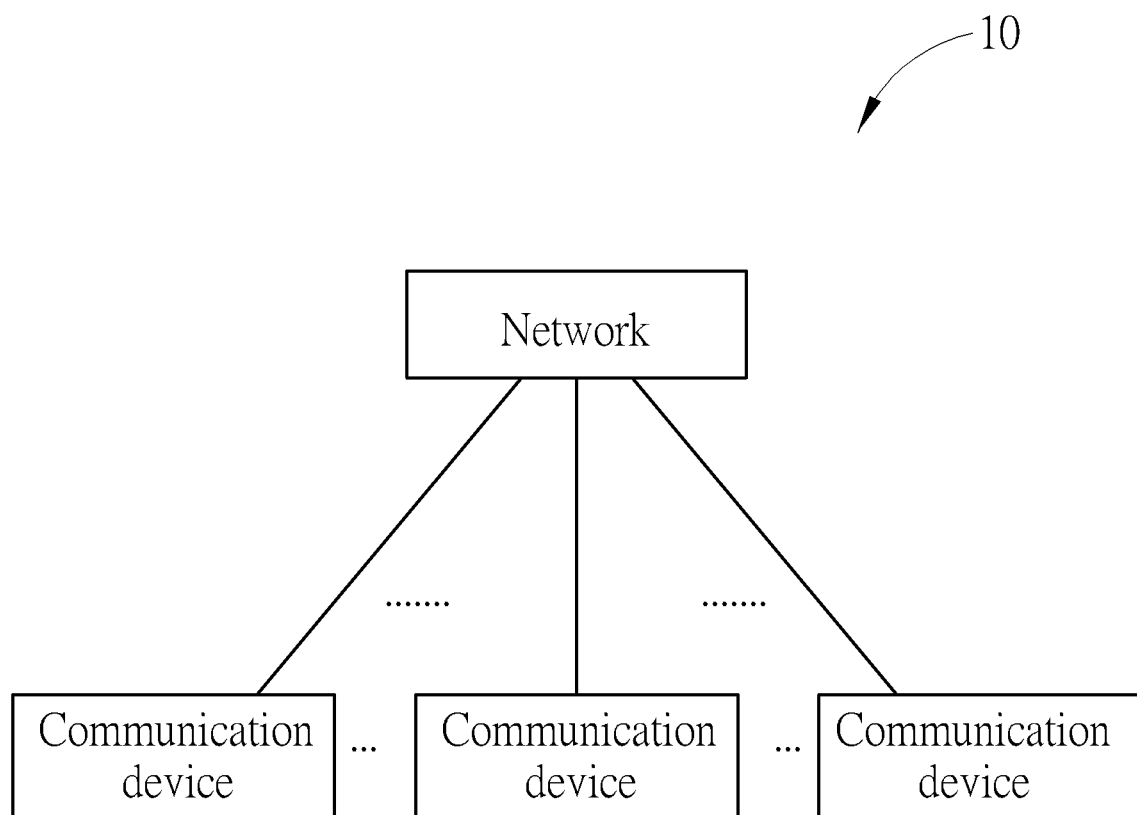
FIG. 1 is a schematic diagram of a wireless communication system according to an example of the present invention.

In FIG. 1, the wireless communication system 10 is briefly composed of a network and a plurality of communication devices. The network and the communication device may communicate with each other via one or multiple cells (e.g., multiple carriers of licensed band (s) and/or unlicensed band(s)) including a primary cell (PCell), zero, one or more secondary cells (SCells) and zero or one primary SCell (PSCell). The abovementioned cells may be operated in the same or different duplexing modes, e.g., frequency-division duplexing (FDD), time-division duplexing (TDD) or flexible duplexing in the same radio access technology (RAT) or different RATs. The RATs may be evolved universal terrestrial radio access (EUTRA), 5G (or called New Radio or NR) or sixth generation (6G). For example, the PCell may be operated on a licensed carrier, while the SCell may be operated on an unlicensed carrier, i.e., a licensed-assisted access (LAA). In one example, the PCell may be operated on an unlicensed carrier without any licensed carrier, i.e., standalone unlicensed access (UA).

The network may comprise at least one base station (BS) to communicate with the communication devices. Practically, the at least one BS may comprise at least one evolved Node-B (eNB) or at least one 5G BS (e.g. gNB). In general, a BS may also be used to refer any of the eNB and the 5G BS.

A communication device may be a user equipment (UE), a NB-IoT UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
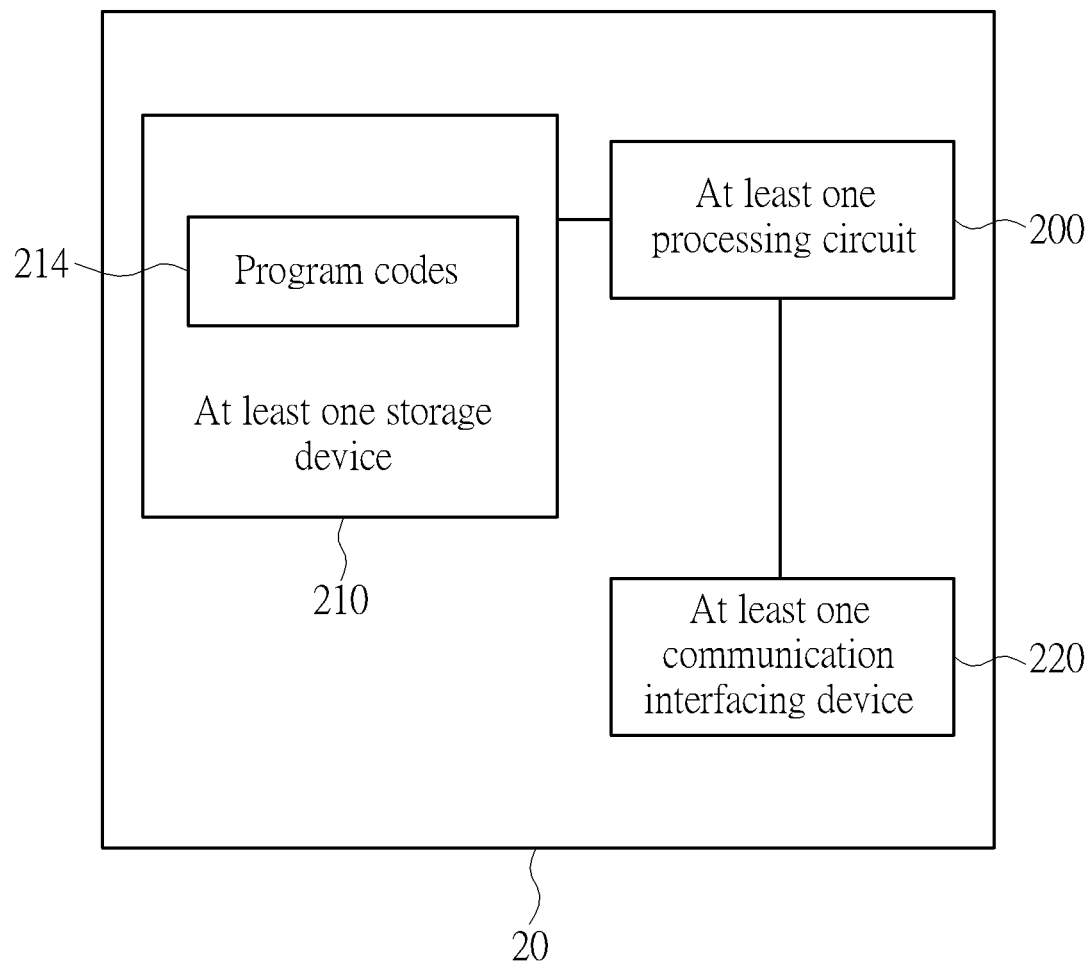
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
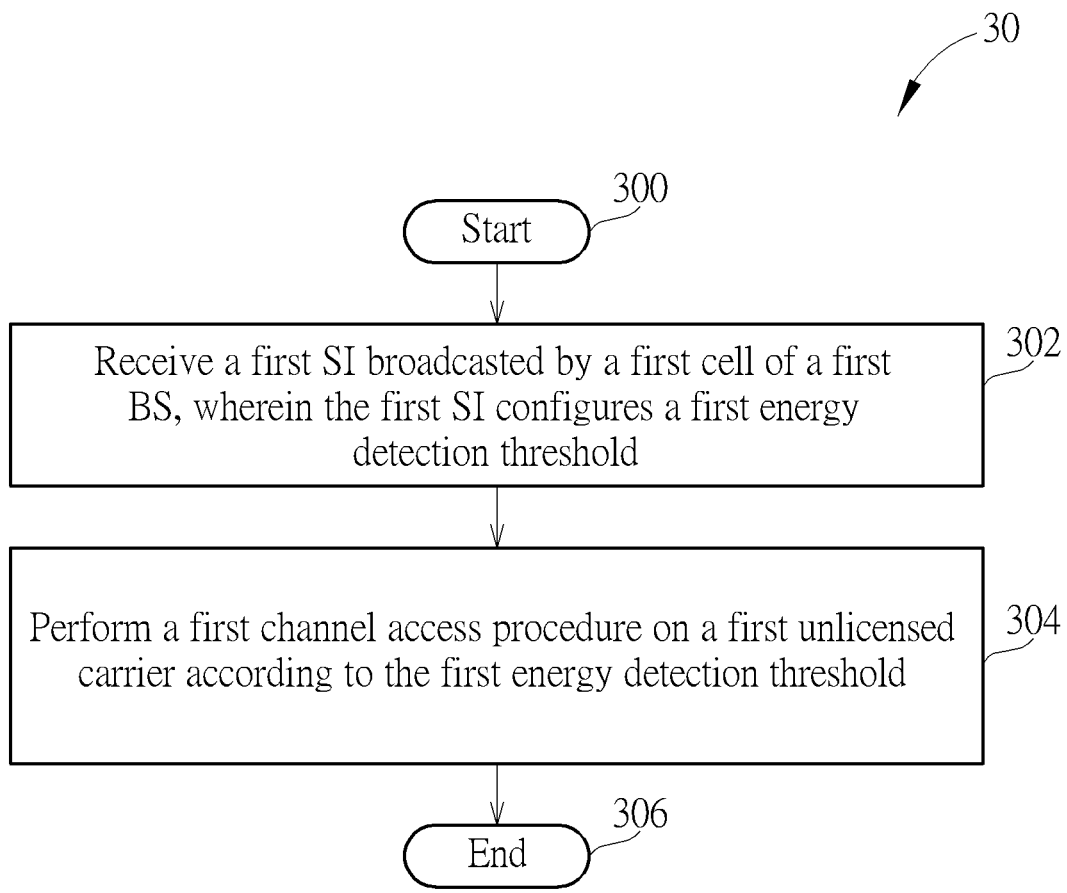
FIG. 3 is a flowchart of a process according to an example of the present invention.

A process 30 in FIG. 3 may be utilized in a UE, and includes the following steps:

Step 300: Start.

Step 302: Receive a first system information (SI) broadcasted by a first cell of a first BS, wherein the first SI configures a first energy detection threshold.

Step 304: Perform a first channel access procedure on a first unlicensed carrier according to the first energy detection threshold.

Step 306: End.

In one example, the UE camps on the first cell and receives the first SI, on the first unlicensed carrier, a second unlicensed or a licensed carrier.

In one example, the first SI is a master information block (MIB) or a SI block (SIB) broadcasted.

In one example, the UE performs the first channel access procedure for performing a transmission on the first unlicensed carrier to the first cell. For example, the transmission may be a random access (RA) preamble, a physical UL shared channel transmission, a sounding reference signal, a physical UL control channel transmission, a hybrid automatic repeat request (HARQ) acknowledgement, a HARQ negative acknowledgement, a channel state information or a channel quality indicator. In one example, the UE performs the transmission, when the UE detects (e.g., senses) that the first unlicensed carrier is idle according to the first channel access procedure and the first energy detection threshold.

In one example, the first SI indicates the first energy detection threshold. In one example, the first SI indicates a first absolute maximum energy detection threshold value or a first offset to a default maximum energy detection threshold value, configuring the first energy detection threshold. The UE may determine (i.e., set, derive or calculate) the first energy detection threshold according to the first absolute maximum energy detection threshold value or according to the first offset to the default maximum energy detection threshold value.

In one example, the first BS transmits a first dedicated radio resource control (RRC) message configuring a second energy detection threshold to the UE on a RRC connection with the UE. For example, the first dedicated RRC message indicates a second absolute maximum energy detection threshold value or a second offset to a default maximum energy detection threshold value, configuring the second energy detection threshold. The UE determines the second energy detection threshold according to the second absolute maximum energy detection threshold value or according to the second offset to a default maximum energy detection threshold value. Then, the UE performs a second channel access procedure according to the second energy detection threshold instead of the first energy detection threshold when/after receiving the first dedicated RRC message.

In one example, the UE stops using the second energy detection threshold when releasing the RRC connection with the first BS. In one example, the UE may use the first energy detection threshold when releasing the RRC connection with the first BS. In one example, the UE may receive a second SI broadcasted by a second cell of the first BS or a second BS on the first unlicensed carrier, the second unlicensed carrier or the licensed carrier, wherein the second SI configures a third energy detection threshold. Examples of determining the first energy threshold can be applied to determining the third energy threshold. The UE performs a third channel access procedure according to the third energy detection threshold instead of the first energy detection threshold.

In one example, the UE keeps using the second energy detection threshold (e.g., for the channel access procedure) until receiving a second dedicated RRC message configuring a third energy detection threshold from the first BS on the RRC connection. The second dedicated RRC message may indicate a third absolute maximum energy detection threshold value or a third offset to a default maximum energy detection threshold value, configuring the third energy detection threshold. The UE performs a third channel access procedure according to the third energy detection threshold instead of the second energy detection threshold when/after receiving the second dedicated RRC message.

In one example, the first BS transmits (via the first cell, i.e., a source cell) a handover command to the UE on a RRC connection with the UE to hand over the UE to a second cell (i.e., a target cell) of the first BS or of a second BS. The handover command may configure a second energy detection threshold. For example, the handover command may indicate a second absolute maximum energy detection threshold value or a second offset to a default maximum energy detection threshold value, configuring the second energy detection threshold. The UE may determine the second energy detection threshold according to the second absolute maximum energy detection threshold value or according to the second offset to a default maximum energy detection threshold value. When the UE synchronizes to the second cell indicated in the handover command, the UE performs a second channel access procedure via the second cell on an unlicensed carrier according to the second energy detection threshold, to transmit a handover complete message to the second cell or to initiate a RA procedure with the second cell.

When the UE detects (e.g., senses) that the unlicensed carrier is idle according to the second channel access procedure, the UE transmits the handover complete message or a RA preamble of the RA procedure via the second cell on the unlicensed carrier.

In one example, the second BS may generate the handover command including the second energy detection threshold, the second absolute maximum energy detection threshold value or the second offset to the default maximum energy detection threshold value. The second BS may send the handover command to the first BS. Then, the first BS may transmit the handover command to the UE.

A BS (i.e., the first BS or the second BS) may receive the RA preamble, and transmit a RA response (RAR), on the unlicensed carrier, in response the RA preamble. The BS may receive the handover complete message from the UE. The BS may perform a channel access procedure to transmit the RAR. When the BS detects (e.g., senses) that the unlicensed carrier is idle according to the channel access procedure, the BS transmits the RAR to the UE.

In one example, the UE keeps using the second energy detection threshold (e.g., for a channel access procedure) until receiving a second SI (e.g., MIB or SIB) of the second cell, configuring a third energy detection threshold. For example, the second SI may indicate the third energy detection threshold. The second SI may indicate a third absolute maximum energy detection threshold value or a third offset to a default maximum energy detection threshold value, configuring the third energy detection threshold. The UE performs a third channel access procedure according to the third energy detection threshold instead of the second energy detection threshold when/after receiving the second SI message.

Figure 4:
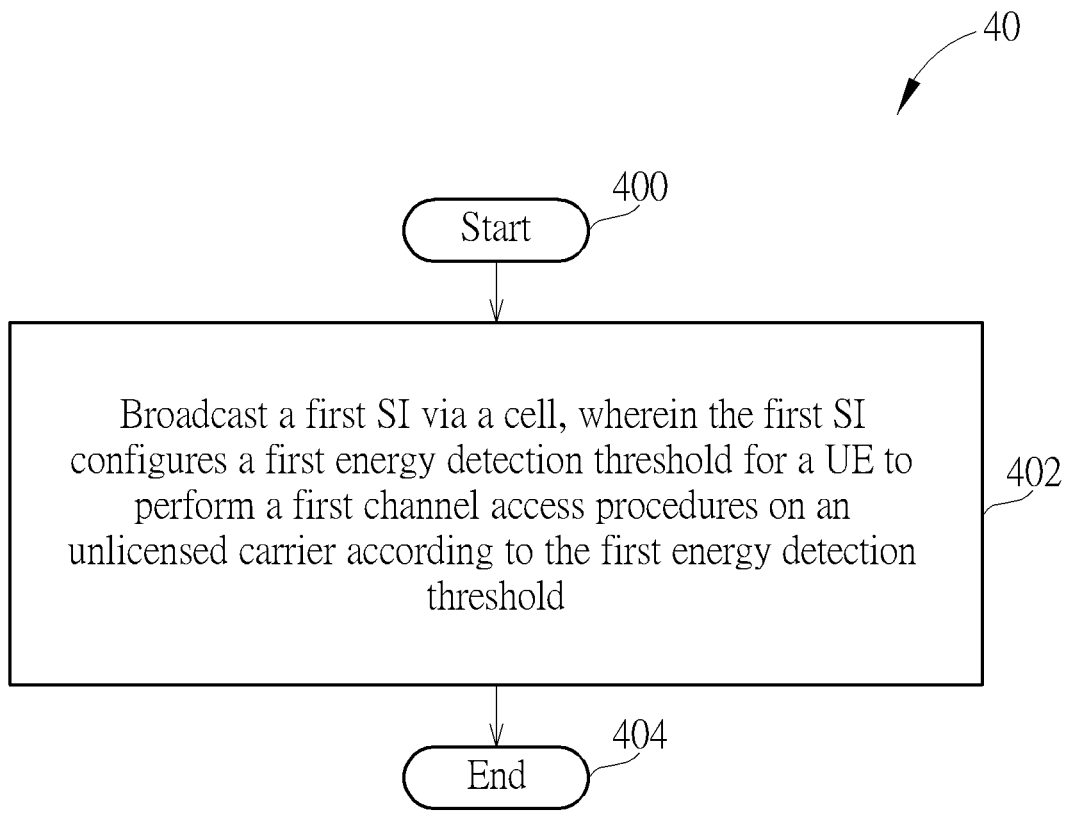
FIG. 4 is a flowchart of a process according to an example of the present invention.

Description of the first BS in the process 30 may be summarized to a process 40 in FIG. 4. The process 40 is utilized in a BS (e.g., the first BS in the process 30), and includes the following steps:

Step 400: Start.

Step 402: Broadcast a first SI via a cell, wherein the first SI configures a first energy detection threshold for a UE to perform a first channel access procedures on an unlicensed carrier according to the first energy detection threshold.

Step 404: End.

In one example, the BS broadcasts the first SI via the cell of the BS on the unlicensed carrier, for configuring the first energy detection threshold. For example, the first SI indicates the first energy detection threshold to configure the first energy detection threshold. For example, the first SI indicates a first absolute maximum energy detection threshold value or a first offset to a default maximum energy detection threshold value to configure the first energy detection threshold. Later, the BS may broadcast a second SI via the cell of the BS on the unlicensed carrier, wherein the second SI configures a second energy detection threshold for the UE to perform a second channel access procedure on the unlicensed carrier according to the second energy detection threshold. For example, the second SI indicates the second energy detection threshold to configure the second energy detection threshold. For example, the second SI indicates a second absolute maximum energy detection threshold value or a second offset to a default maximum energy detection threshold value configuring the second energy detection threshold.

In one example, the BS may broadcast a third SI on a third cell. The third SI may configure a third energy detection threshold different from the first/second energy detection threshold.

In one example, the first SI and the second SI may be different instances of a MIB or a SIB. That is, the second SI updates the first SI. The first SI, the second SI and third SI may be a MIB or may be a SIB of the same type (e.g., SIB type x, x may be an integer, e.g., 1, 2, 3, . . . ).

In one example, the BS determines the first/second energy detection threshold according to an energy level (or an interference level) detected on the unlicensed carrier by the BS. For example, the BS determines the first energy detection threshold, when the energy level (or the interference level) is lower than (or equal to) a first threshold. The BS may determine the second energy detection threshold, when the energy level (or the interference level) is higher than the first threshold or a second threshold. For example, the BS determines the first energy detection threshold, when the energy level (or the interference level) is in a first range. The BS may determine the second energy detection threshold, when the energy level (or the interference level) is in a second range.

When the UE receives the first SI, the UE may perform the first channel access procedure according to the first energy detection threshold. When the UE receives the second SI, the UE may perform the second channel access procedure according to the second energy detection threshold.

Description for the process 30 may be applied to the process 40. Description for the process 40 may be applied to the process 30.

Figure 5:
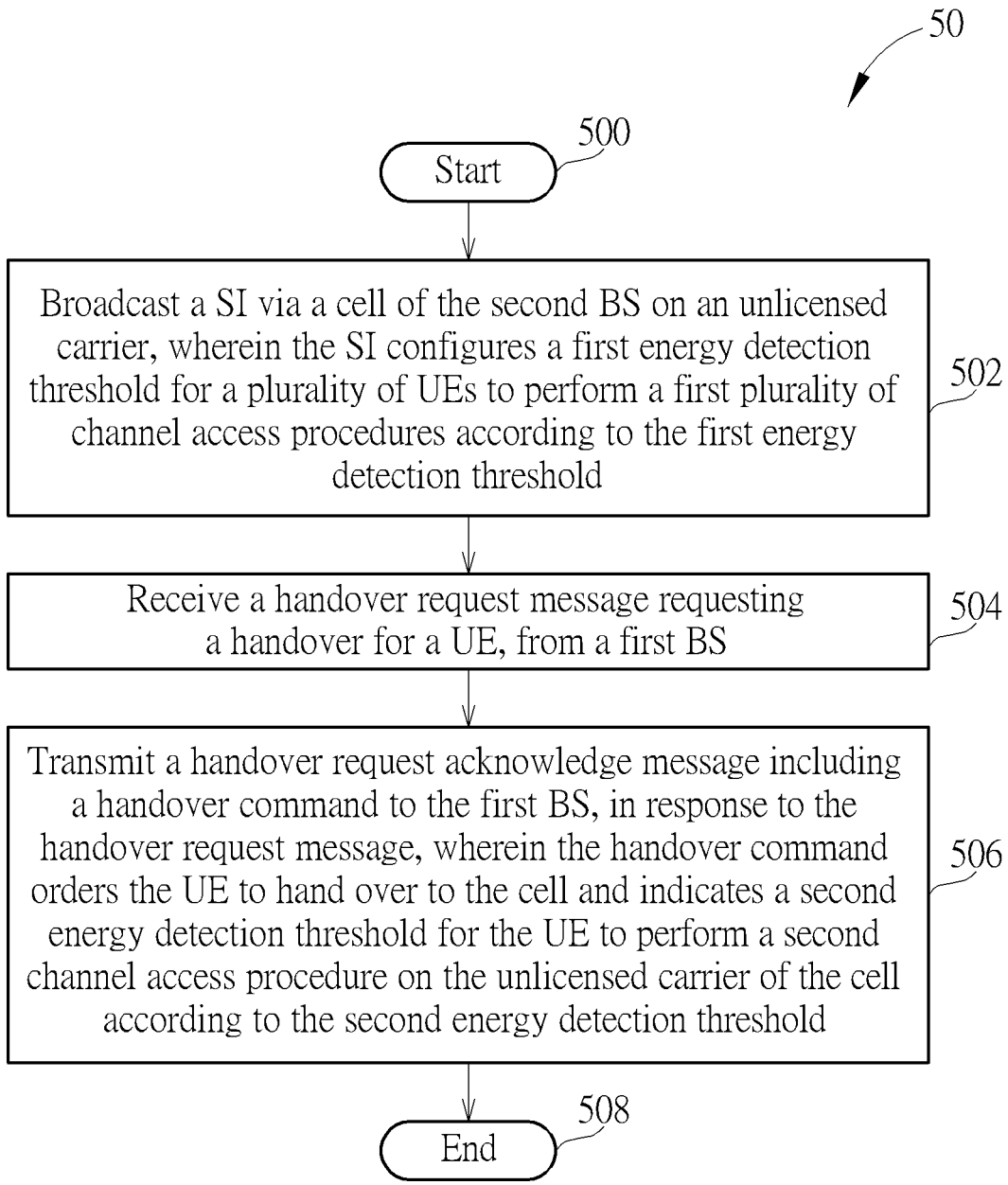
FIG. 5 is a flowchart of a process according to an example of the present invention.

Description of the second BS in the process 30 may be summarized to a process 50 in FIG. 5. The process 50 is utilized in a second BS (e.g., the second BS in the process 30), and includes the following steps:

Step 500: Start.

Step 502: Broadcast a SI via a cell of the second BS on an unlicensed carrier, wherein the SI configures a first energy detection threshold for a plurality of UEs to perform a first plurality of channel access procedures according to the first energy detection threshold.

Step 504: Receive a handover request message requesting a handover for a UE, from a first BS.

Step 506: Transmit a handover request acknowledge message including a handover command to the first BS, in response to the handover request message, wherein the handover command orders the UE to hand over to the cell and indicates a second energy detection threshold for the UE to perform a second channel access procedure on the unlicensed carrier of the cell according to the second energy detection threshold.

Step 508: End.

In one example, the SI indicates the first energy detection threshold. In one example, the SI indicates a first absolute maximum energy detection threshold value or a first offset to a default maximum energy detection threshold value to the first plurality of UEs, configuring the first energy detection threshold.

In one example, the SI indicates the second energy detection threshold. In one example, the handover command indicates a second absolute maximum energy detection threshold value or a second offset to a default maximum energy detection threshold value to the UE, configuring the second energy detection threshold.

In one example, the first energy detection threshold and the second energy detection threshold are the same (i.e., have the same value) or different (i.e., have different values).

Description for the processes 30-40 may be applied to the process 50. Description for the process 50 may be applied to the processes 30-40.

In one example, the UE determines (e.g., sets or uses) the first energy detection threshold according to the default maximum energy detection threshold value, when the SI of a cell does not configure the first energy detection threshold (i.e., the SI does not configure any energy detection threshold for a channel access procedure on an unlicensed carrier of the cell). That is, the first SI configures the default maximum energy detection threshold value. The default maximum energy detection threshold value may be predetermined by the UE according to the 3GPP specification(s).

In one example, "indicate" above may be replaced by "include". In one example, the dedicated RRC message may be a RRC reconfiguration message, a RRC setup message, a RRC resume message or a RRC reestablishment message. The UE may transmit a dedicated RRC response message on the unlicensed carrier of the cell in response to the dedicated RRC message. The dedicated RRC response message may be a RRC reconfiguration complete message, a RRC setup complete message, a RRC resume complete message or a RRC reestablishment complete message.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a channel access procedure. Thus, the UE knows how to perform the channel access procedure on the unlicensed carrier. As a result, the problem regarding the channel access procedure on the unlicensed carrier is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a channel access procedure, comprising:
   a storage device; and
   a processing circuit, coupled to the storage device, wherein the storage device stores instructions, and the processing circuit is configured to execute the instructions of:
   receiving system information (SI) broadcasted by a first cell of a first BS, wherein the SI configures a first energy detection threshold;
   determining the first energy detection threshold according to a first absolute maximum energy detection threshold value indicated in the SI or according to a first offset to a default maximum energy detection threshold value indicated in the SI;
   performing a first channel access procedure on a first unlicensed carrier according to the first energy detection threshold;
   transmitting a random access preamble when the communication device detects that the first unlicensed carrier is idle according to the first channel access procedure;
   receiving a handover command from the first BS on a RRC connection with the first BS, wherein the handover command configures a second energy detection threshold and indicates a second cell of the first BS or a second BS;
   determining the second energy detection threshold according to a second absolute maximum energy detection threshold value indicated in the handover command or according to a second offset to a default maximum energy detection threshold value indicated in the handover command;
   performing a second channel access procedure via the second cell on the first or a second unlicensed carrier according to the second energy detection threshold; and
   transmitting a random access preamble or a handover complete message via the second cell when the communication device detects that the first or second unlicensed carrier is idle according to the second channel access procedure.

2. The communication device of claim 1, wherein the instructions further comprise:
   performing a transmission on the first unlicensed carrier, when the communication device detects that the first unlicensed carrier is idle according to the first channel access procedure.

3. The communication device of claim 1, wherein the instructions further comprise:
   determining the first energy detection threshold according to the default maximum energy detection threshold value, when the SI does not configure the first energy detection threshold.

4. The communication device of claim 1, wherein the instructions further comprise:
   receiving a dedicated radio resource control (RRC) message from the first BS on a RRC connection with the first BS, wherein the dedicated RRC message configures a third energy detection threshold; and
   performing a third channel access procedure according to the third energy detection threshold.

5. A method for handling a channel access procedure of a communication device, comprising:
   receiving system information (SI) broadcasted by a first cell of a first BS, wherein the SI configures a first energy detection threshold;
   determining the first energy detection threshold according to a first absolute maximum energy detection threshold value indicated in the SI or according to a first offset to a default maximum energy detection threshold value indicated in the SI;
   performing a first channel access procedure on a first unlicensed carrier according to the first energy detection threshold;
   transmitting a random access preamble when the communication device detects that the first unlicensed carrier is idle according to the first channel access procedure;
   receiving a handover command from the first BS on a RRC connection with the first BS, wherein the handover command configures a second energy detection threshold and indicates a second cell of the first BS or a second BS;
   determining the second energy detection threshold according to a second absolute maximum energy detection threshold value indicated in the handover command or according to a second offset to a default maximum energy detection threshold value indicated in the handover command;
   performing a second channel access procedure via the second cell on the first or a second unlicensed carrier according to the second energy detection threshold; and
   transmitting a random access preamble or a handover complete message via the second cell when the communication device detects that the first or second unlicensed carrier is idle according to the second channel access procedure.

6. The method of claim 5, wherein the method further comprises:
   performing a transmission on the first unlicensed carrier, when the communication device detects that the first unlicensed carrier is idle according to the first channel access procedure.

7. The method of claim 5, wherein the method further comprises:
   determining the first energy detection threshold according to the default maximum energy detection threshold value, when the SI does not configure the first energy detection threshold.

8. The method of claim 5, wherein the method further comprise:
   receiving a dedicated radio resource control (RRC) message from the first BS on a RRC connection with the first BS, wherein the dedicated RRC message configures a third energy detection threshold; and
   performing a third channel access procedure according to the third energy detection threshold.

* * * * *